US006563280B2

(12) United States Patent
Firehammer et al.

(10) Patent No.: US 6,563,280 B2
(45) Date of Patent: May 13, 2003

(54) PULSE BASED SERVO MOTOR CONTROLLED LABELER

(75) Inventors: Paul W. Firehammer, Livonia, MI (US); William B. Henry, Chelsea, MI (US)

(73) Assignee: Whedco, Inc., Ann Arbor, MI (US)

( * ) Notice: Subject to any disclaimer, the term of this patent is extended or adjusted under 35 U.S.C. 154(b) by 0 days.

(21) Appl. No.: 09/800,111

(22) Filed: Mar. 6, 2001

(65) Prior Publication Data

US 2001/0054470 A1 Dec. 27, 2001

Related U.S. Application Data

(60) Provisional application No. 60/187,262, filed on Mar. 6, 2000.

(51) Int. Cl.[7] .................................... G05B 11/01

(52) U.S. Cl. .................................... 318/560; 318/603

(58) Field of Search .................................... 318/603, 604, 318/605, 615, 618, 162, 163, 560, 567, 568.16; 156/64, 351, 361, 542, 584, 363

(56) References Cited

U.S. PATENT DOCUMENTS

| | | | | |
|---|---|---|---|---|
| 4,294,644 A | | 10/1981 | Anderson | |
| 4,488,925 A | | 12/1984 | Craig et al. | |
| 4,639,884 A | * | 1/1987 | Sagues | 318/603 |

* cited by examiner

*Primary Examiner*—Khanh Dang
(74) *Attorney, Agent, or Firm*—James M. Deiman

(57) ABSTRACT

A labeling machine servo motor to drive the label feed is combined with a control system which tracks the surface of the item to be labeled wherein all of the parameters affecting the placement of the label are instantly programmable.

Label motion starting position, label acceleration and deceleration rates, label speed, and label stop position are all under program control and may be adjusted within the control system or by an external device utilizing a network, a serial interface, or a discrete input/output interface to the control system. In the preferred embodiment, the control system comprises a servo controller easily programmable and reprogrammable in the necessary parameters to effect more accurate and faster label application.

9 Claims, 3 Drawing Sheets

$$\text{NEW POSITION} = f_1(x) + f_2(x) + f_3(x)$$

$$F_1(x) = a_{11} + a_{12}X + a_{13}X^2 + a_{14}X^3$$

$$F_2(x) = a_{21} + a_{22}X + a_{23}X^2 + a_{24}X^3$$

$$F_3(x) = a_{31} + a_{32}X + a_{33}X^2 + a_{34}X^3$$

PULSE BASED SERVO MOTOR CONTROLLED LABELER

This application claims the benefit of provisional patent application No. 60/187,262 filed Mar. 6, 2000.

BACKGROUND OF THE INVENTION

1. Field of the Invention

This invention relates to servo motion controls for applying labels to a moving surface and, in particular, to servo systems providing high speed, precise label placement at a desired location on the moving surface.

2. Description of the Prior Art

Servo motors and controls have been applied for some time in high-speed labeling machines such as those disclosed in U.S. Pat. No. 4,294,644 and U.S. Pat No. 4,488,925 wherein a servo motor and servo drive are used to apply labels to a moving surface.

The latter patented device is not able to gradually accelerate or decelerate the label web nor can this device automatically accommodate or track changes in product moving surface speed during application of the label. This device places the labels by causing the labels to start and stop in as short a time as the labeling mechanism will allow. These abrupt starts and stops reduce the accuracy of the label placement, decrease the life of the labeling mechanism, and increase breakage of the label web.

The former patented device, in contrast, does provide gradual acceleration and deceleration of the label web; however, this device does not allow for rapid and convenient adjustment of most of the parameters affecting label placement.

SUMMARY OF THE INVENTION

Increasing the speed and accuracy of label placement is a continuing goal because overall production may be constrained by the rate at which labels can be accurately and smoothly applied to the moving surfaces. As a part of speed and accuracy control, it is desirable to provide automatic compensation for web and label stretch or shrinkage and for recovery from a spliced label within one product cycle.

In addition, the control should provide for cycle initiation at a consistent location with respect to the surface on which the label is to be applied, present the label to the surface at a consistent location with respect to the surface and at a consistent velocity with respect to the surface, and maintain that velocity with respect to the surface during the label application.

Furthermore, the control should include the ability to make rapid changes to the labeling machine parameters in order to improve label placement and the capability to make rapid change from one label type to another.

The invention comprises a labeling machine servo motor to drive the label feed in combination with a control system which tracks the surface of the item or part to be labeled and in which all of the parameters affecting the placement of the label are instantly programmable. Label motion starting position, label acceleration and deceleration rates, label speed, and label stop position are all under program control and may be adjusted within the control system or by an external device utilizing a network, a serial interface, or a discrete input/output interface to the control system. In the preferred embodiment, the control system comprises a servo controller easily programmable and reprogrammable in the necessary parameters to effect more accurate and faster label application.

DESCRIPTION OF THE PREFERRED EMBODIMENTS

Figure 1:
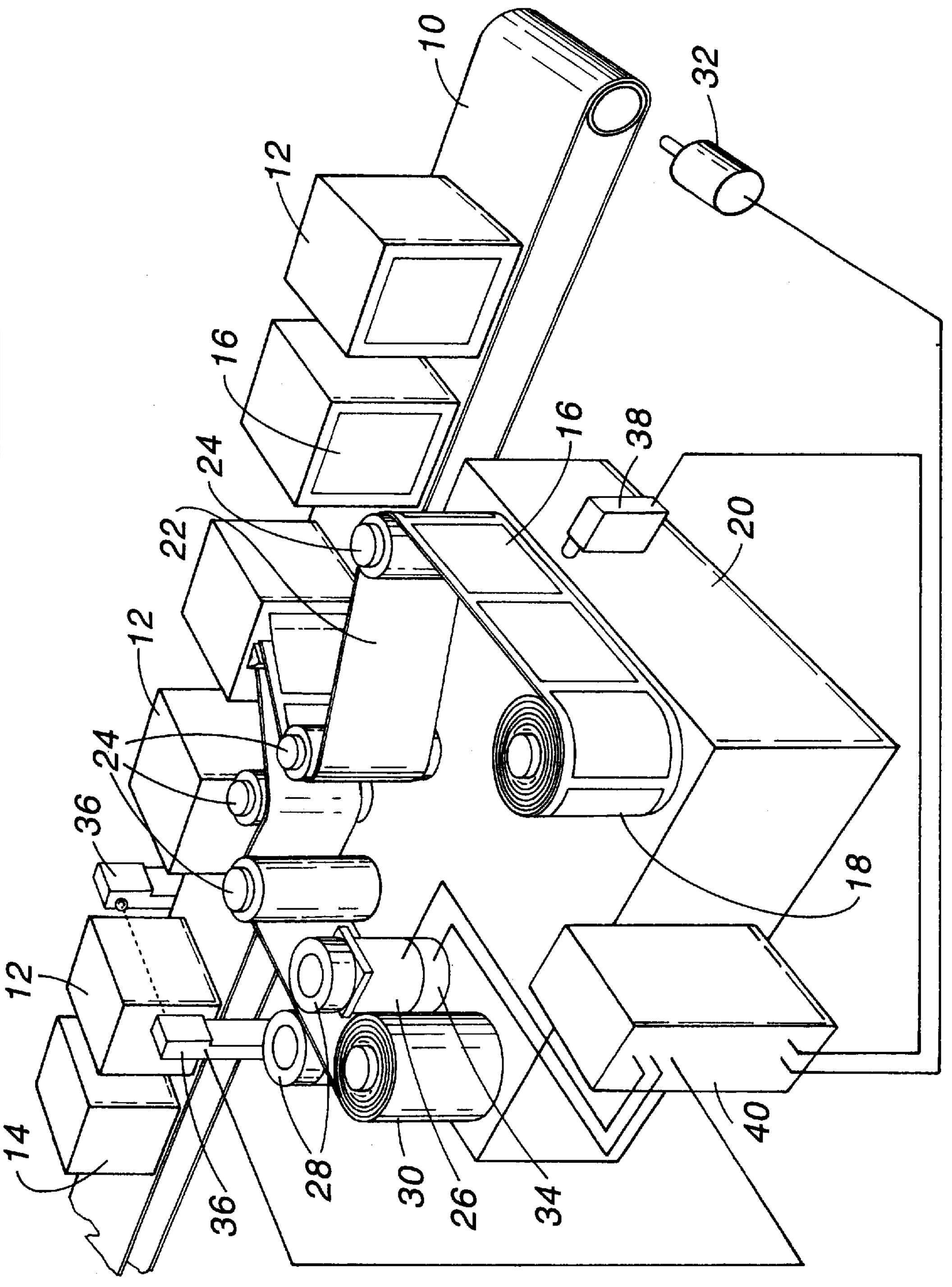
FIG. 1 is a perspective view of the new labeler adjacent a conveyor.

In FIG. 1 a moving conveyor 10 supports a plurality of containers 12 having surfaces 14 upon which labels 16 are applied. The labels 16 are supplied on a web roll 18 from which the labeling machine 20 is fed. The label web 22 winds through a series of idler rollers 24 in the process of applying the labels 16 to the container surfaces 14. The label web 22 is propelled by a servo motor 26 and squeeze rollers 28 and is rewound at 30.

To control the application of the labels 16 to the container surfaces 14, sensors and other devices are employed to continuously monitor movement of the conveyer 10, containers 12 and label web 22. Conveyor 10 speed and acceleration is provided by an encoder 32. Servo motor 26 speed and acceleration is provided by a resolver 34. Moving containers 12 are sensed by an edge sensor 36 and labels 16 on the web 22 sensed by a label end sensor 38. Analog or digital information from the encoder 32, resolver 34, and sensors 36 and 38 is provided by electrical connection to the servo controller 40.

Figure 2:
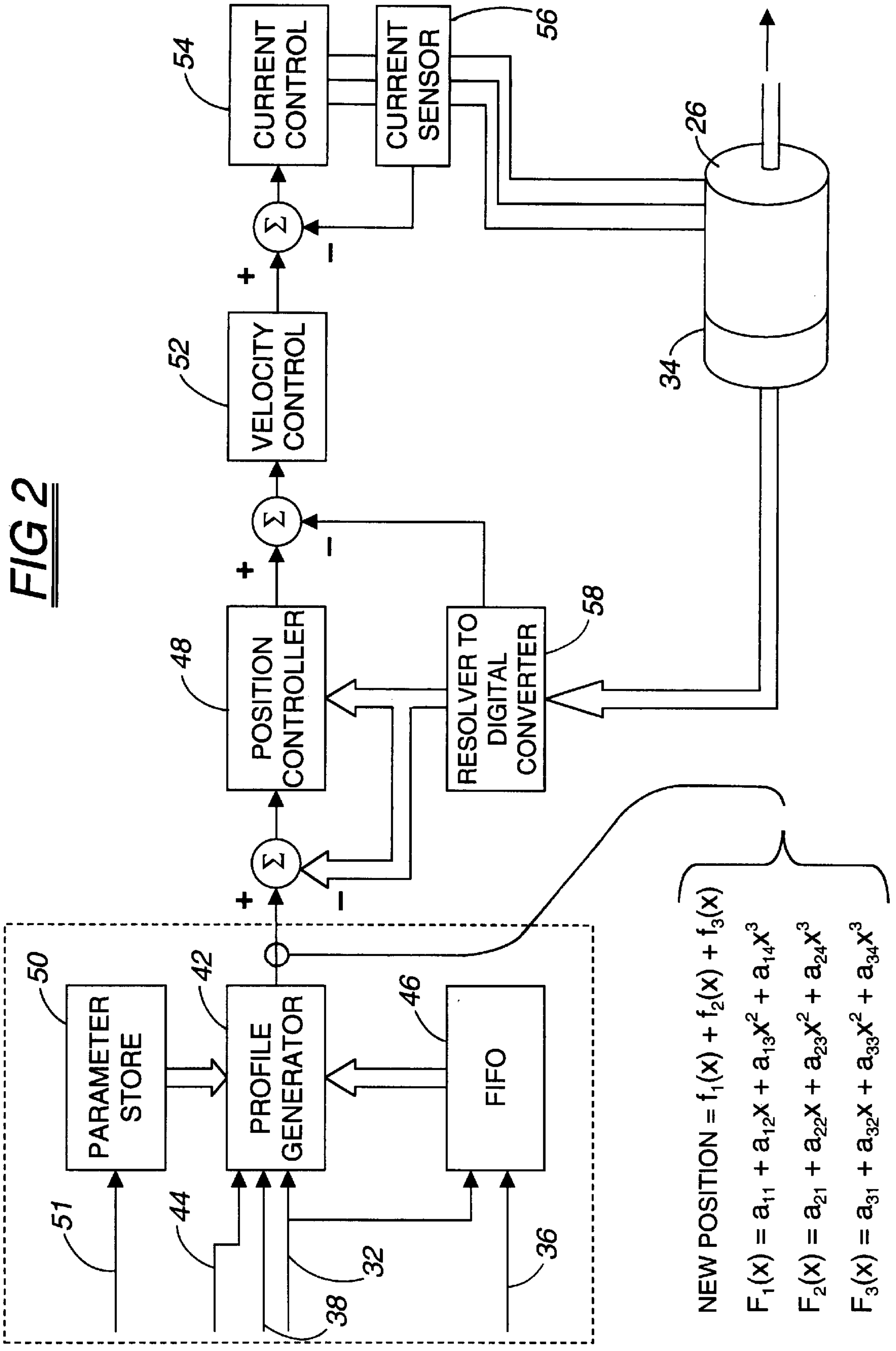
FIG. 2 is a schematic diagram and flow chart of the servo controller.

Illustrated in FIG. 2 is a schematic diagram of the control components. The position profile generator 42 receives system clock 44, label registration sensor 38 and conveyor encoder 32 information to coordinate the label web 22 movement with the conveyor 10. The containers 12 are container edge sensed 36 and recorded in a first in first out (FIFO) register 46 to form a stacked memory of approaching containers (edges) which is input to the profile generator 42. The profile generator 42 thereby outputs container 12 movement information as indicated by the mathematical expressions to the position controller 48 which coordinates the label web 22 movement with the container 12 movement. As an option, a variety of labels for a variety of containers can be preprogrammed in the form of electronic recipes 51 in a memory (parameter) store 50 for the profile generator 42. This option avoids the need to reprogram the profile generator 42 whenever labels and containers are changed.

The position controller 48 and servo motor 26 are connected in a loop comprising a velocity control 52 and current control 54 with current sensor 56 leading to the servo motor. Feedback to the position controller 48 is through the resolver 34 on the servo motor 26 and digital convertor 58.

Figure 3:
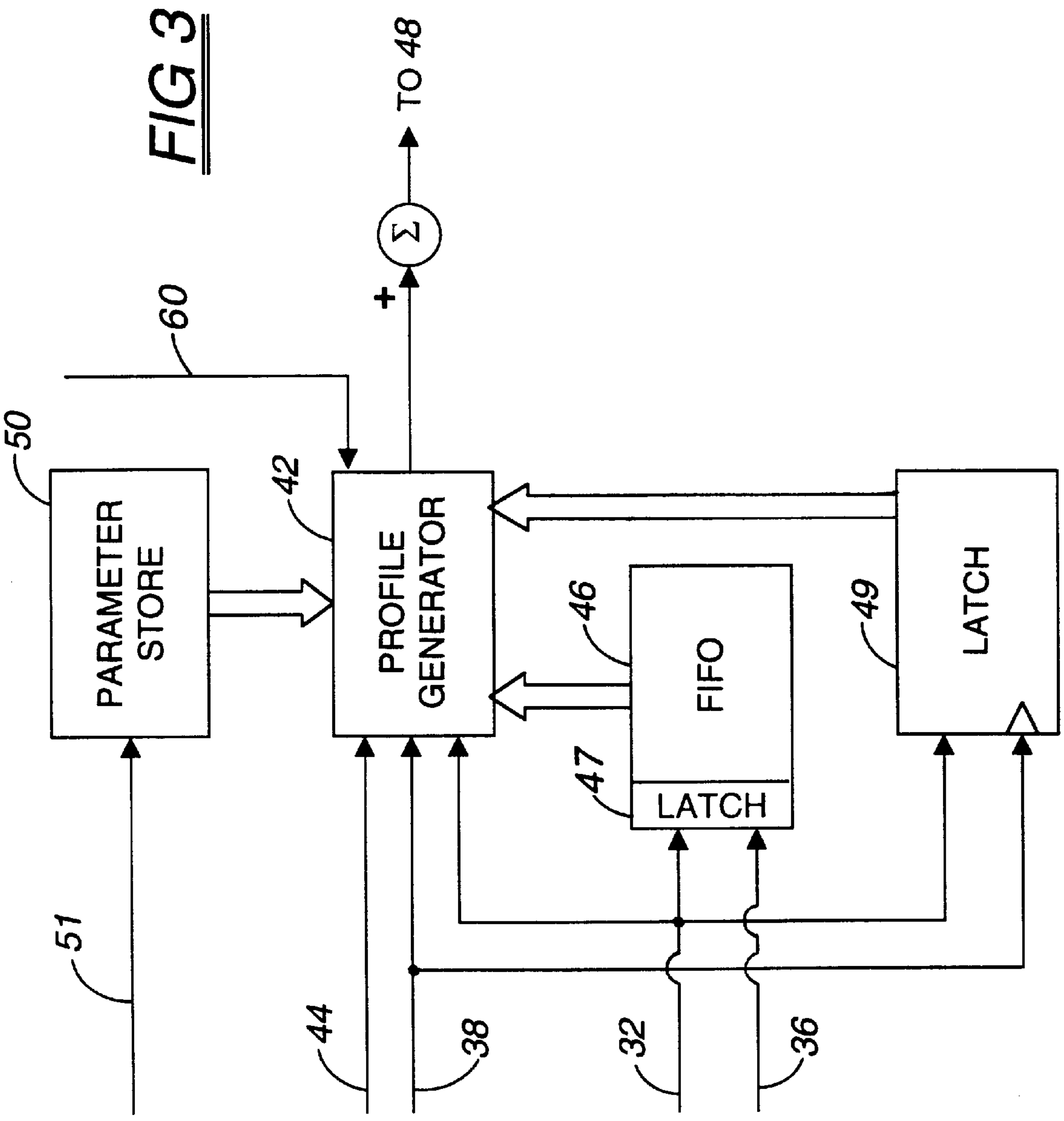
FIG. 3 is a flow chart of an alternative form of the servo controller.

Illustrated in FIG. 3 is an option providing for mode selection 60 between time, based on the internal system clock 44, and the encoder 32. Thus, the labeler can be moved independently of the conveyor for label web 22 threading through the path from the web roll 18 to the rewind roll at 30. The FIFO register 46 includes a latch function 47 for the direct input from encoder 32 and edge sensor 36. An external latch 49 is provided for a direct input from the encoder 32 and the label end sensor (registration sensor) 38 to the profile generator 42. These functions greatly ease set up time for a new container and label combination or splicing a new label web 22 to the previous label web.

By providing the servo control configuration above described, a considerable number of important variables are adjustable to provide greater versatility to the labeler. Label placement tracks the surface conveyor through the conveyor encoder 32, thus providing instantaneous and automatic compensation for changes in container speed on the conveyor. An approaching container edge position can be captured by the servo controller from the external sensor 36 with the label start position on the container 12 defined as an offset from the edge position.

The controller register 46, by maintaining a FIFO register of a plurality of edge positions for a plurality of containers, allows sensor 36 to be more flexibly placed upstream of the labeler with multiple containers in between. Thus, conveyor and machine design constraints are eased.

With the new controller, label feed rate is a programmable function of the surface feed rate (conveyor speed). Thus, the labels can be applied with a controlled pre-planned amount of compression or stretch.

More specifically, the label feed parameters including acceleration (label motor pulses (from resolver 34) per conveyor encoder 32 pulses ^2), deceleration (label motor pulses per conveyor encoder pulses ^2), velocity (label motor pulses per conveyor encoder 32 pulses), label feed distance (total label motor pulses per total conveyor encoder pulses), label feed start position (conveyor encoder pulses), label feed after label edge sensor 38 input (total label motor pulses per total conveyor encoder pulses) are all programmable and may be changed on a label to label basis. Thus, the labeler can be quickly adjusted by an operator for optimum label placement. Also, the parameters for a given label may be stored 50 to generate label recipes. These already stored recipes can be quickly downloaded to the profile generator 42 resulting in little or no down time to change from one label type or label length to a label of another type or length. Only an initial quality control check may be needed to assure accuracy in label placement before a large quantity of labels are affixed automatically.

What is claimed is:

1. A servo motor controller for a labeler comprising a profile generator and a position controller, said position controller output continuously controlling position and rotational speed of a label servo motor in response to information from a label servo motor summed with information from said profile generator, a first-in-first-out register to supply to the profile generator positional information on a plurality of containers approaching the labeler, and a velocity control having an input comprising output information from the position controller summed with information from a label servo motor.

2. The servo motor controller of claim 1 including a resolver in mechanical communication with a label servo motor, the resolver output information being input to the position controller.

3. The servo motor controller of claim 2 wherein the resolver output information is simultaneously summed with the information output from the profile generator and summed with information output from the velocity control.

4. The servo motor control of claim 1, including a label parameter store to supply label parameter information to the profile generator.

5. The servo motor control of claim 1 including means to latch the first-in-first-out register and means to latch the profile generator.

6. A servo motor controller for a labeler comprising a profile generator and a position controller, said position controller output continuously controlling position and rotational speed of a label servo motor in response to information from a label servo motor summed with information from said profile generator, a first-in-first-out register to supply to the profile generator positional information on a plurality of containers approaching the labeler, a container sensor to supply container leading edge information to the first-in-first-out register and an encoder to supply conveyor position and velocity information to the profile generator.

7. The servo motor controller of claim 6 including a label sensor to supply label edge information to the profile generator.

8. The servo motor control of claim 6 including a label parameter store to supply label parameter information to the profile generator.

9. The servo motor control of claim 6 including means to latch the first-in-first-out register and means to latch the profile generator.

* * * * *